US008107569B2

(12) United States Patent
Chang

(10) Patent No.: US 8,107,569 B2
(45) Date of Patent: Jan. 31, 2012

(54) METHOD AND APPARATUS FOR CHANNEL BONDING USING A MULTIPLE-BEAM ANTENNA

(75) Inventor: Donald Chin-Dong Chang, Thousand Oaks, CA (US)

(73) Assignee: Spatial Digital Systems, Inc., Chatsworth, CA (US)

( * ) Notice: Subject to any disclaimer, the term of this patent is extended or adjusted under 35 U.S.C. 154(b) by 728 days.

(21) Appl. No.: 12/122,541

(22) Filed: May 16, 2008

(65) Prior Publication Data

US 2008/0292035 A1 Nov. 27, 2008

Related U.S. Application Data

(60) Provisional application No. 60/930,958, filed on May 21, 2007, provisional application No. 60/930,957, filed on May 21, 2007.

(51) Int. Cl.
*H04B 7/10* (2006.01)

(52) U.S. Cl. ...................................................... 375/347

(58) Field of Classification Search .................. 375/347; 370/455
See application file for complete search history.

(56) References Cited

U.S. PATENT DOCUMENTS 7,020,472 B2 3/2006 Schmidt
2005/0105632 A1 5/2005 Catreux-Erces et al.
2006/0045048 A1 * 3/2006 Kwon et al. .................. 370/329
2007/0160040 A1 * 7/2007 Kwon ........................... 370/389
2009/0046681 A1 * 2/2009 Kalogridis et al. ........... 370/338

* cited by examiner

*Primary Examiner* — Jaison Joseph
(74) *Attorney, Agent, or Firm* — O'Melveny & Myers LLP

(57) ABSTRACT

A system is provided that enhances the throughput and reliability of wireless communications by providing multi-beam user terminals that exhibit directional discrimination. Multiple wireless communication channels are matched with multiple beams created from an array antenna by a beam-forming processor. The multiple wireless communication channels are bonded into a single virtual channel, thereby increasing data bandwidth while reducing interference and multi-path effects that can degrade communications. The beam-forming function may be performed in a dedicated beam-forming processor or may reside within a general-purpose microprocessor located in the user terminal.

33 Claims, 7 Drawing Sheets

METHOD AND APPARATUS FOR CHANNEL BONDING USING A MULTIPLE-BEAM ANTENNA

RELATED APPLICATION DATA

This application claims the benefit, pursuant to 35 U.S.C. §119(e), of U.S. provisional application Ser. No. 60/930,958, filed May 21, 2007, and U.S. provisional application Ser. No. 60/930,957, filed May 21, 2007.

BACKGROUND OF THE INVENTION

1. Field of the Invention

The present invention relates to techniques for improving the throughput and reliability of wireless links by bonding communication channels together. More particularly, the invention relates to techniques for using multi-beam antennas to communicate with spatially separated wireless access points that are then bonded to increase channel bandwidth.

2. Description of Related Art

It is well known in the art to increase the bandwidth and reliability of a communication interface by combining, or bonding, two or more sets of interface hardware. A network interface card on a host computer, for example, may be limited to a certain maximum data rate. A second network interface card can be added to the host computer, and software running on the host computer can be made to divide up information packets across the two network interface cards such that portions of a message to be transmitted are sent over both network interface cards simultaneously. If each network card operates at its full bandwidth, the combined bandwidth of the entire system is effectively doubled. At the receiving end, the two network data streams are received simultaneously, and the receiving computer reassembles the transmitted data message by properly organizing the packets received from each of the two network interface cards.

Alternatively, the technique of adding a second network interface card to a host computer can be used to create redundancy for the transmission of important data. In this case, the host computer sends the same data packets over two independent network interface cards. The receiving computer compares the incoming data from the two channels to assure that the data is received without error. If a mismatch between the two channels is discovered, the receiving computer can request a retransmission of the corrupted data.

The channel bonding methods described above are generally applied to hard-wired connections over copper wire or fiber optics because such hard-wired systems provide good isolation between the two or more independent communication channels. When channel bonding is attempted over wireless networks, interference between the multiple wireless network cards can cause communication failures or excessively high error rates. To minimize interference, the multiple wireless systems can be tuned to different frequency channels. However, of the eleven channels in the 2.4-GHz frequency band of the IEEE 802.11 b and g wireless standards, only channels 1 and 11 are spaced sufficiently far apart that they may be used simultaneously without excessive interference, limiting the channel-frequency choices. Furthermore, equipment that uses channel bonding on channels 1 and 11 will effectively use up the entire 802.11 spectrum, locking out any other wireless networks in the broadcast area. As a result of the competition for bandwidth of multiple network users, the overall data throughput may actually decrease.

A solution to this problem is to spatially separate the wireless data streams that are to be bonded in order to reduce interference from simultaneous transmissions that are at or near the same frequency. However, current wireless network cards and laptop computer systems use omni-directional, low-gain antennas to communicate with wireless access points. Such antennas provide little spatial discrimination and are thus not suitable for this purpose. However, providing a dedicated processor to generate spatially separated beams can add significant complexity and cost. Accordingly, it would be useful to provide a wireless system that can communicate simultaneously over multiple, spatially separated beams that can be bonded into a single virtual channel to provide increased data bandwidth and/or improved communication channel reliability. It would further be useful to use existing processor resources to support digital beam forming to create a low-cost smart DBF antenna for consumer electronics.

SUMMARY OF THE INVENTION

A system is provided that enhances the throughput and reliability of wireless communications by providing multi-beam user terminals that exhibit directional discrimination. Multiple wireless communication channels are matched with multiple beams, and the channels are bonded into a single virtual channel, thereby increasing data bandwidth while reducing interference and multi-path effects that can degrade communications.

An embodiment of a wireless communication system in accordance with the present invention includes a media center that contains communication data to be sent wirelessly to one or more user terminals. The media center is physically attached to at least two wireless access points, such as those that comply with the IEEE 802.11 wireless networking specification. The media center divides the communication data to be sent into portions that will be broadcast from each of the access points. If the primary objective is to increase the speed of data transfer, the two portions will contain little if any overlapping data. If the primary purpose is to provide robustness, the two portions will contain significant amounts of overlapping data.

A user terminal is configured to receive the data from the two access points. The user terminal includes an antenna that is composed of at least two radiating elements. When signals from the access points arrive at the radiating elements of the array antenna, signals from each of the array elements are processed by a beam-forming processor. The beam-forming processor adjusts the amplitude and phase of the signals received from the individual antenna array elements in order to create at least two beams pointing in different directions. By properly adjusting the amplitude and phase of the received signals, they can be made to add coherently for certain directions and incoherently for other directions. The beam-forming processor is thus used to create one beam that points in a direction to the first access point and a second beam that points in the direction of the second access point.

The user terminal then demodulates the first beam and the second beam to recover the first data portion and the second data portion. The two portions are then bonded together to create a single virtual channel. If the two portions contain little data overlap, the effect of the bonding operation is to increase the data throughput by approximately a factor of two. On the other hand, if there is significant data overlap between the first and second portions, the effect is to improve the robustness of the wireless communication system by providing redundant data information without slowing the information transfer rate.

The beam forming process may be performed in either the analog or digital domain. In an analog system, the analog signals received from each element of the antenna array are routed through phase shifters to adjust their relative phase and through amplifiers to scale their amplitudes. The scaled and phase-shifted signals are then combined to form a composite coherent beam pointing in the selected direction. Simultaneously, a second set of phase shifters and amplifiers is used to adjust the same antenna array signals by different amounts to create a second coherent beam that points in a second direction. The directions of the coherent beams are set to point to the access points that are broadcasting the communication data.

In a digital beam-forming system, the signals from the antenna array are first digitized using an analog-to-digital (A/D) converter. The digital samples are then multiplied by complex beam weighting factors that include both amplitude and phase components. Different sets of weighting vectors will create beams pointing in different directions. The digital beam-forming processor may create any number of digital beams by multiplying the sampled data from the A/D converter by different sets of weighting vectors and then combining the weighted samples to form composite coherent beams.

In an embodiment of a beam-forming system in accordance with the present invention, the digital processing and formation of multiple beams is performed in a dedicated beam-forming processor. However, an alternative embodiment of a beam-forming system in accordance with the present invention uses already-existing processing resources to perform the beam-forming algorithms. For example, in a system using a laptop computer as the user terminal, a fraction of the processing power, typically 5% to 10%, of the laptop's general-purpose microprocessor would be reserved for real-time beam-forming processing. The beam-forming algorithms would thus run in the background, behind the other processing tasks of the laptop computer, and would demand processing resources as needed. Thus, the electronics associated with the transmit/receive antenna would simply convert received microwave waveforms to digital bit streams and would convert digital bit streams to transmitted microwave waveforms. The antenna would thus act as a low-cost smart DBF antenna that could be integrated with consumer electronics having inherent processing power that could be utilized. Software running on the main processor of the consumer electronics device would execute the beam-forming processing steps.

Behind the array antenna is a radio-frequency front end. This may comprise a low-noise amplifier (LNA) associated with each antenna element, followed by a band-pass filter and a frequency down-converter to convert the received radio-frequency signals to a lower intermediate frequency before being digitized by an A/D converter. Alternatively, because fast A/Ds may be capable of handing the 2.4 GHz signals of the IEEE 802.11 standard directly, the down-conversion stage may be eliminated, and digitization may take place directly at radio frequency.

The transmit side of a user terminal according to the present invention operates similarly. In transmit, a router splits data into two paths. The data in each of the paths is modulated onto a digital baseband waveform which is then sent to a digital beam forming (DBF) processor. Each DBF processor applies appropriate complex beam weighting factors to adjust the amplitudes and phases of the waveforms to be applied to the elements of the patch antenna array. As discussed above, the DBF processors could be dedicated units or the algorithms could execute on the primary processor of the host device to embed the beam-forming vectors into the digital data stream sent to the antenna. Analog waveforms are then synthesized from the digital baseband waveforms by D/A converters. The analog waveforms are then frequency up-converted to radio frequency, filtered, amplified by solid-state power amplifiers or similar devices, and applied to elements of the patch array. Note that with very high-speed D/A converters, direct radio-frequency synthesis may be possible, and the frequency up-conversion stage could then be eliminated.

In an alternative embodiment of a wireless communication system in accordance with the present invention, signals from the elements of the receiving array antenna may be combined before digitization in order to reduce the number of A/D converters required and to make the radio-frequency front end more conducive to being implemented in a radio-frequency integrated circuit (RFIC). In order to combine the signals in such a way that the individual signals from each antenna element can be recovered for subsequent beam-forming processing, a series of orthogonal modulating codes is used. The signal from each of the array elements is passed through a bi-phase modulator. The modulating input of each bi-phase modulator is driven by a pseudonoise (PN) code. The PN codes are chosen to be mutually orthogonal and are applied synchronously to the signals from each of the array elements. The modulated signals are then summed and digitized by a single A/D converter. In the digital domain, the composite sample stream is then convolved with each of the PN codes, and owing to the orthogonal nature of each of the codes, only the signal component originally modulated with that code will be recovered. Digital sample streams associated with each of the elements of the antenna array are thus presented to the digital beam forming processor, and multiple beams can be synthesized. As discussed previously, the digital beam forming unit could be a dedicated processing unit or could comprise a portion of the general-purpose microprocessor of the host device. In its most integrated form, a smart antenna in accordance with the present invention would comprise patch antenna elements and a radio-frequency integrated circuit. The RFIC would send digital data to the main microprocessor of the host device, which would calculate and apply the beam weight vectors to create multiple digital beams. In transmit, digital data would be multiplied by weighting vectors in the host microprocessor, and a digital data stream with embedded beam-forming vectors would be delivered to the RFIC, which would then transmit the data from the antenna elements.

From the foregoing discussion, it should be clear to those skilled in the art that certain advantages have been achieved in a communication system employing channel bonding over multiple antenna beams that achieve spatial separation, thereby reducing interference and increasing data bandwidth. Further advantages and applications of the invention will become clear to those skilled in the art by examination of the following detailed description of the preferred embodiment. Reference will be made to the attached sheets of drawing that will first be described briefly.

DETAILED DESCRIPTION OF THE PREFERRED EMBODIMENT

The invention provides a system for bonding multiple wireless communication channels using multi-beam directional antennas in order to improve communication bandwidth and reliability. In the detailed description that follows, like element numerals are used to indicate like elements appearing in one or more of the figures.

Figure 1:
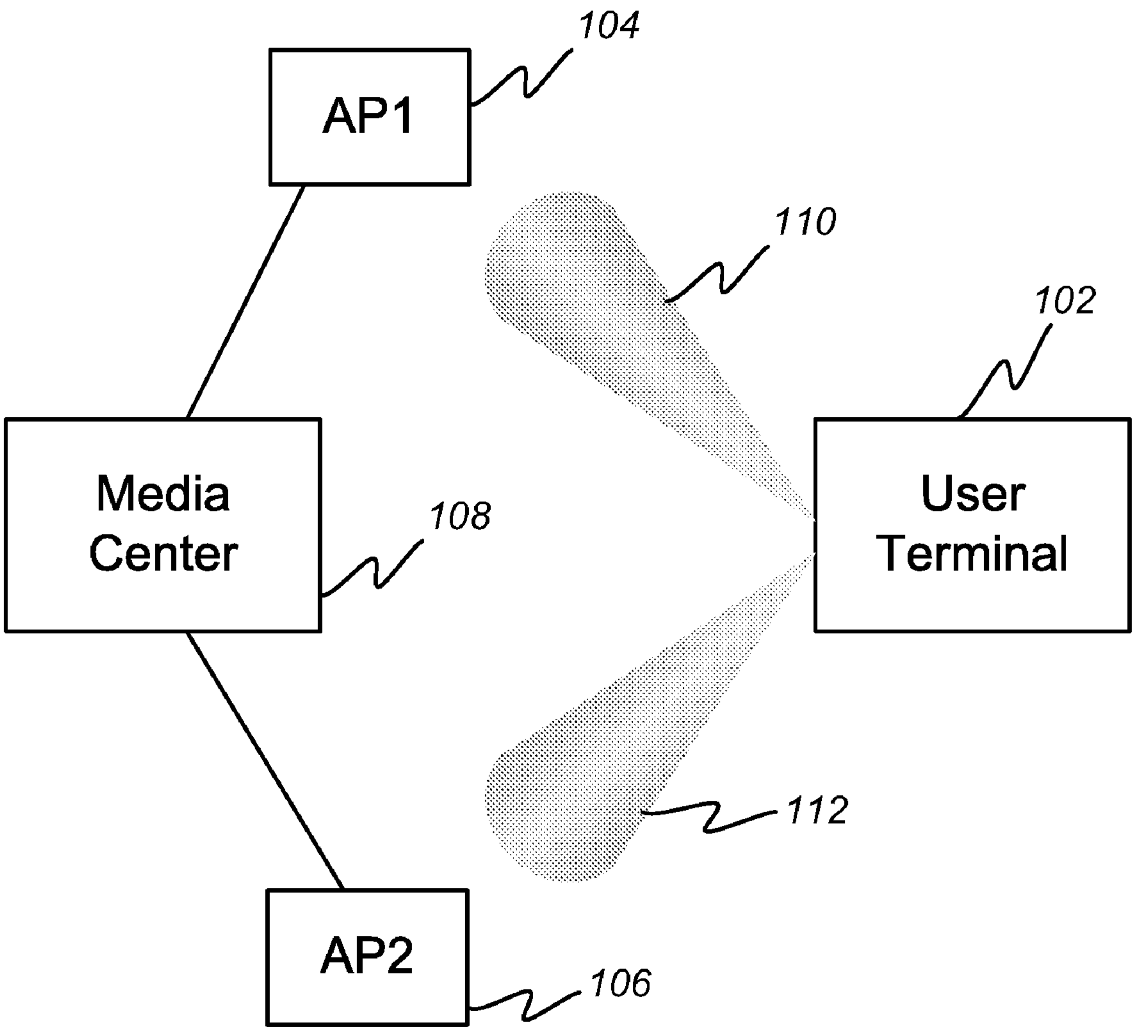
FIG. 1 depicts a media center connected to two spatially-separated wireless access points, and a multi-beam user terminal in accordance with the present invention.

FIG. 1 depicts a block diagram of an embodiment of a multiple-beam wireless networking system in accordance with the present invention. A media center 108 stores data that it makes available to a wireless network over two spatially separated wireless access points 104 and 106. A user terminal 102 includes a multi-beam antenna capable of pointing narrow beams 110 and 112 in the directions to the two access points 104 and 106, respectively. The user terminal 102 includes a digital-beam-forming (DBF) processor described in more detail below with reference to FIG. 3. The DBF processor allows the construction of two spatially-separated beams that can be independently steered toward the access points 104 and 106. Of course, more than two access points and more than two beams are also possible and would fall within the scope and spirit of the present invention. Because of the spatial separation achieved by the pointing of the two independent beams, both can operate at the same frequency without causing interference problems. Software well known in the art runs on the media center 108 and on the user terminal 102 to split network packets into portions that will be sent across a first path comprising the first access point 104 and the first user beam 110, and a second path comprising the second access point 106 and the second user beam 112. Since both access points operate at their full individual data rates, the amount of data received by the user terminal 102 in a given time is effectively doubled. Alternatively, a second copy of the data sent to the first access point 104 can also be sent to the second access point 106. The user terminal 102 then receives redundant copies of the same data from two independent sources. This redundancy can be used to improve the reliability and quality of the link while avoiding the reduction in data rate collateral to the use of error-correcting codes.

Figure 2:
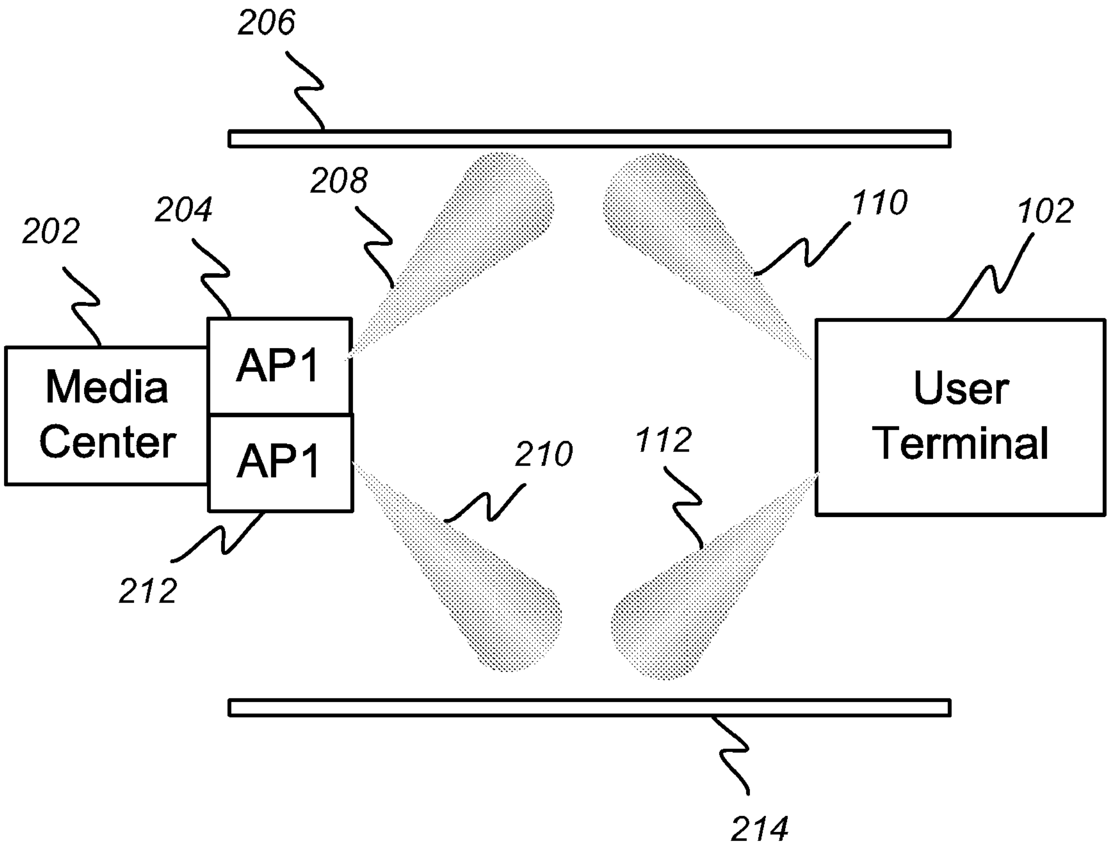
FIG. 2 illustrates an alternative embodiment of a multiple-beam channel bonding communication system in accordance with the present invention.

FIG. 2 illustrates an alternative embodiment of a multiple-beam wireless networking system in accordance with the present invention that does not require the access points to be spatially separated. The media center 202 is connected to two wireless access points 204 and 212 that may be located very close to one another. Each access point, however, includes a DBF processor and an appropriate array antenna that allows it to create a narrow, directional beam, i.e., 208 and 210. For an indoor application, each access point beam 208 and 210 can be directed toward a wall 206 and 214 or other surface that is capable of reflecting a portion of the incident energy. The user terminal 102, also includes a DBF processor and appropriate antenna elements allowing the creation of at least two beams 110 and 112 that are pointed in a direction to line up with the reflected energy from the access-point beams 208 and 210.

Of course, other configurations are possible in which the access-point beams 208 and 210 are pointed directly at the user terminal beams 110 and 112, as long as the directional selectivity of the beams is high enough to limit interference from the neighboring beam. Furthermore, systems that include more than two access points and more than two user-terminal beams also lie within the scope and spirit of the present invention.

Figure 3:
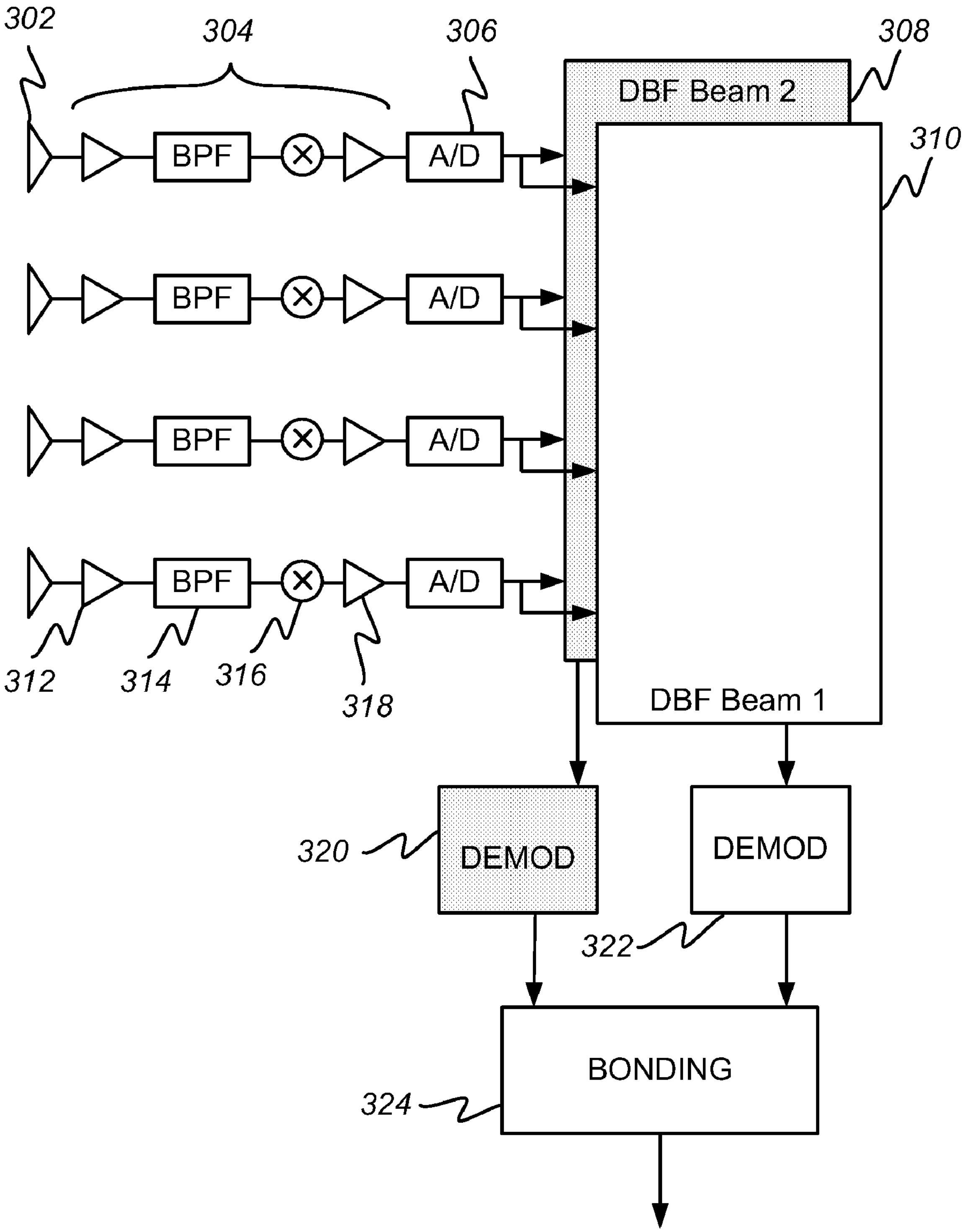
FIG. 3 is a block diagram of an embodiment of the receive portion of a user terminal in accordance with the present invention.

FIG. 3 is a block diagram of the receive side of an embodiment of a DBF system used to create multiple user-terminal beams in accordance with the present invention. The system depicted in FIG. 3 comprises a four-element array antenna. Each of the elements includes an antenna element 302, a radio-frequency front end 304, and an analog-to-digital converter 306. The radio-frequency front end 304 includes a low-noise amplifier 312, followed by a band-pass filter 314 to limit out-of-band noise, a frequency down-converter 316, and an intermediate-frequency or baseband-frequency amplifier 318. The analog-to-digital converter 306 samples the frequency-down-converted signals and presents the samples to two digital beam forming (DBF) processors 308 and 310 for processing the received radio-frequency signals. Of course, a single DBF processor may also be used that is capable of performing two independent beam calculations within the sampling rate of the A/D converters 306. At the 2.4 GHz IEEE 802.11 frequency band, it is also feasible to digitize the incoming signal directly at the RF frequency with a very fast A/D and high-speed digital processing. Such a system that eliminates the down-conversion hardware would also fall under the scope and spirit of the present invention.

The DBF processors 308 and 310 apply complex weighting factors to the signal samples received from each of the RF channels to adjust the amplitude and phase of the samples. The weighted samples are then combined by the first DBF processor 310 to form a coherent beam pointing in a first direction, and they are combined by the second DBF processor 308 with a different set of weighting factors in order to produce a coherent beam pointing in a second direction. Proper selection of the weighting factors used in the digital beam-forming process thus allows the received RF energy to be analyzed from two independent directions. As the distance between the antenna elements is increased, the width of the synthesized beams decreases, improving the directional selectivity of the antenna array.

For high-performance systems, the DBF processors 308 and 310 can be implemented in one or more dedicated beam-forming processors. However, for many systems utilizing a smart DBF antenna, there is excess processing power in the main processor of the host device or user terminal that can be used to perform the DBF function. For example, in a personal laptop computer using digital beam forming, a portion of the general-purpose microprocessor capacity, typically 5% to 10%, could be allocated to real-time processing of the digital-beam-forming algorithms. DBF processors 308 and 310 would then physically reside within the main host processor and would take advantage of the processing power already present in the system.

The summed coherent beam samples from the first DBF processor 310 and the second DBF processor 308 are then independently demodulated at 322 and 320 to recover the baseband data. The two baseband data streams are then passed to the bonding unit 324 that combines the data packets in order to recover the full message sent over the two spatially separated paths.

Figure 4:
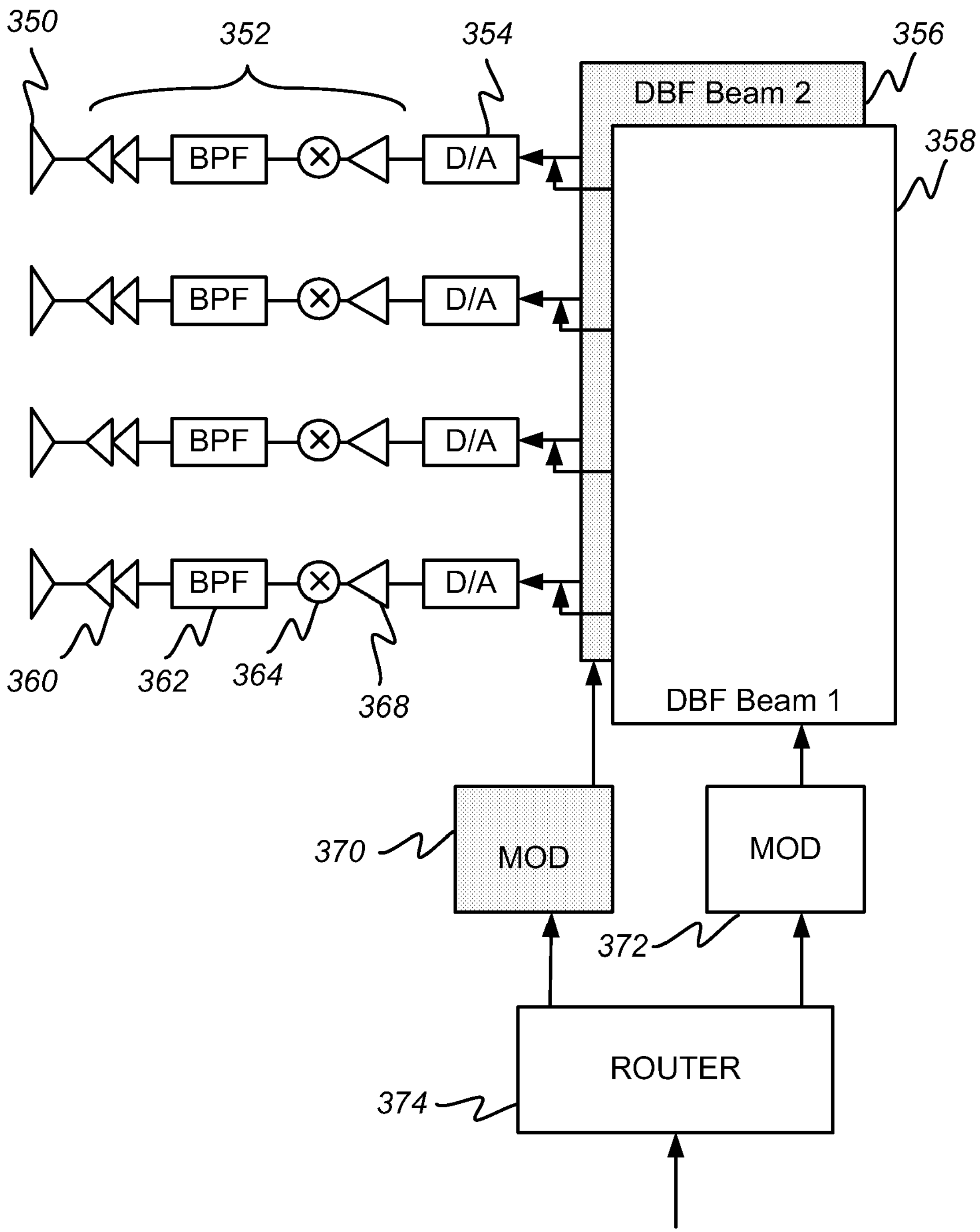
FIG. 4 is a block diagram depicting an embodiment of the transmit portion of a user terminal in accordance with the present invention.

FIG. 4 is a block diagram of the transmit side of an embodiment of a DBF system used to create multiple user-terminal beams in accordance with the present invention. Data to be transmitted is sent to a router 374 that splits the data into two separate paths in order to take advantage of the full bandwidth of each path. The data streams are modulated 370 and 372 onto baseband digital waveforms that are then sent to two digital beam forming (DBF) processors 356 and 358. Note that a single DBF processor that is fast enough to multiplex both beams could also be used. Furthermore, the DBF processors could be implemented within the main microprocessor of the host device, as described previously. Each DBF processor 356 and 358 applies complex beam weighting vectors to each digital baseband waveform in order to create four weighted outputs from each data stream destined for the elements of the patch array antenna 350. The phase and amplitude profile imparted by the DBF processor to each set of baseband data will direct each data stream in a separate direction as it leaves the antenna 350. Each of the weighted digital waveforms is then routed through a digital-to-analog (D/A) converter 354 to synthesize an analog baseband waveform. The analog waveform is then amplified 368 and frequency up-converted 364 to radio frequency. Note that very high-speed D/As may enable direct synthesis at radio frequency, in which case, the frequency up-conversion stage may be eliminated. The up-converted RF signals are then band-pass filtered 362, amplified by solid-state power amplifiers 360 or similar RF amplifiers, and applied to the elements of the patch array 350.

Figure 5:
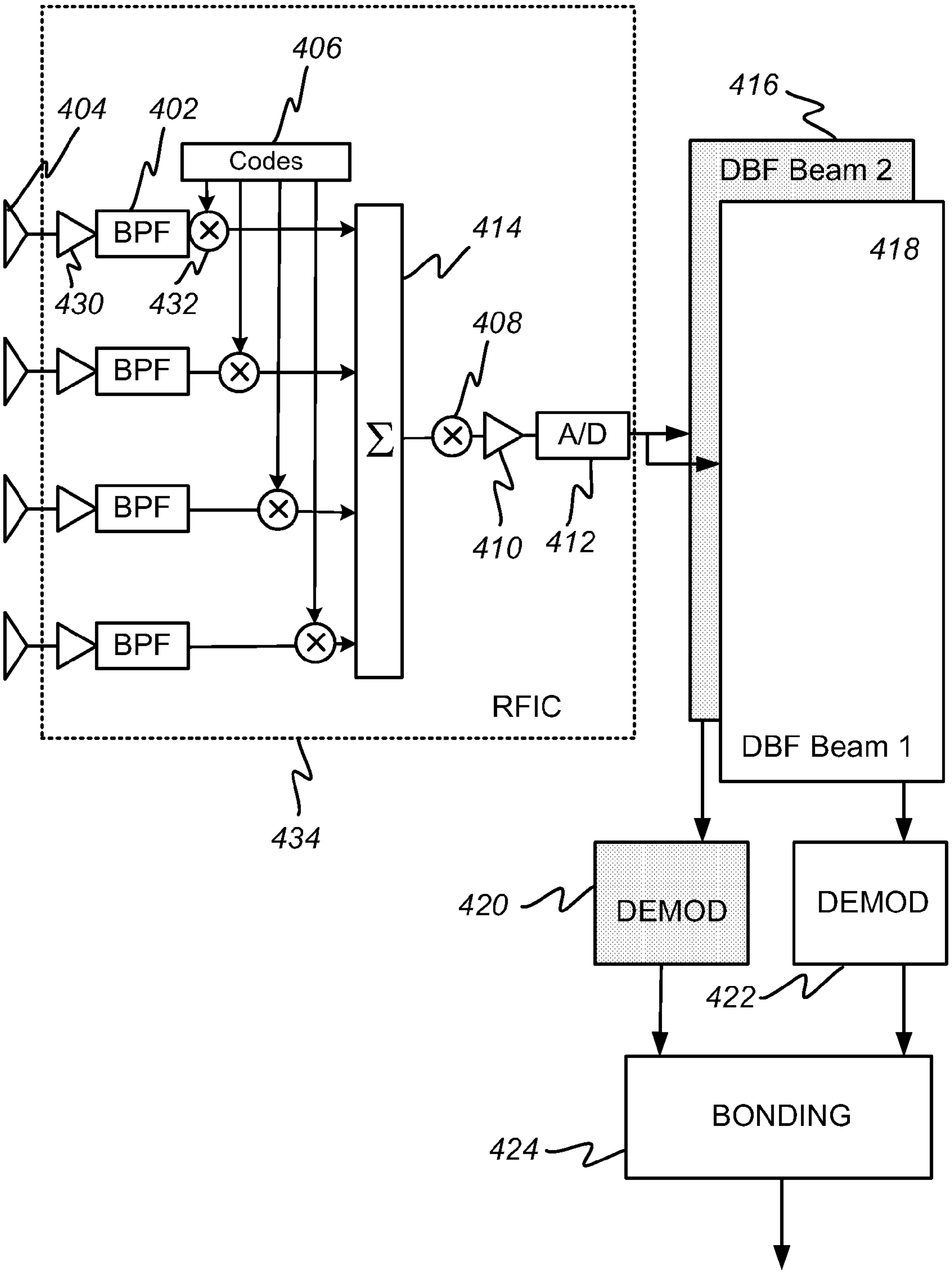
FIG. 5 is a block diagram of an alternative embodiment of a user terminal in accordance with the present invention.

FIG. 5 is a block diagram of an alternative embodiment of a user terminal in accordance with the present invention. An antenna aperture is comprised of four antenna elements 404. Each element is connected to a low-noise amplifier 430 and then to a band-pass filter 402. In order to reduce the number of analog-to-digital converters required, the signals from the four antenna elements are then mixed with orthogonal codes that enable the four signal streams to be combined, digitized, and then subsequently separated out into constituent streams. A code generator 406 generates four separate mutually orthogonal pseudorandom codes that are synchronous with each other. Each code is applied to a bi-phase modulator 432 in order to modulate the signal stream from the corresponding antenna element. The four modulated signal streams are then combined in a summing unit 414. The combined data stream is then frequency down-converted to an intermediate frequency at 408, amplified at 410, and then digitized by a single analog-to-digital converter. Of course, with a sufficiently high-speed analog-to-digital converter, it is possible to digitize directly at the RF frequency and eliminate the down-conversion stage 408. The coding, combining, and digitizing steps are well suited to integration into a single radio-frequency integrated circuit (RFIC) as indicated by the dashed border 434.

The digitized data stream is then passed to the digital beam forming processors 416 and 418. Convolving the digitized data stream with the same orthogonal synchronized code sequences used to combine the individual antenna-element data streams allows the individual streams to be extracted. The extracted digitized streams from the four antenna elements are then multiplied by a first set of complex weighting vectors in the first DBF processor 418 to form a coherent beam pointing in a first direction. They are also multiplied by a second set of complex weighting vectors in the second DBF processor 416 to form a coherent beam pointing in a second direction. The two beams are then demodulated at 420 and 422 and the extracted data packets are then combined in the bonding unit 424 to create a virtual channel with twice the bandwidth of each individual beam. It should be appreciated that a system with more or fewer than four antenna elements or with more than two synthesized beams would also fall within the scope and spirit of the present invention.

Similar orthogonal code processing may be employed on the transmit side in order to reduce the number of D/A converters and frequency up-converters required. This would be particularly advantageous for systems synthesizing directly at radio frequency that would require an expensive and high performance D/A converter.

Figure 6A:
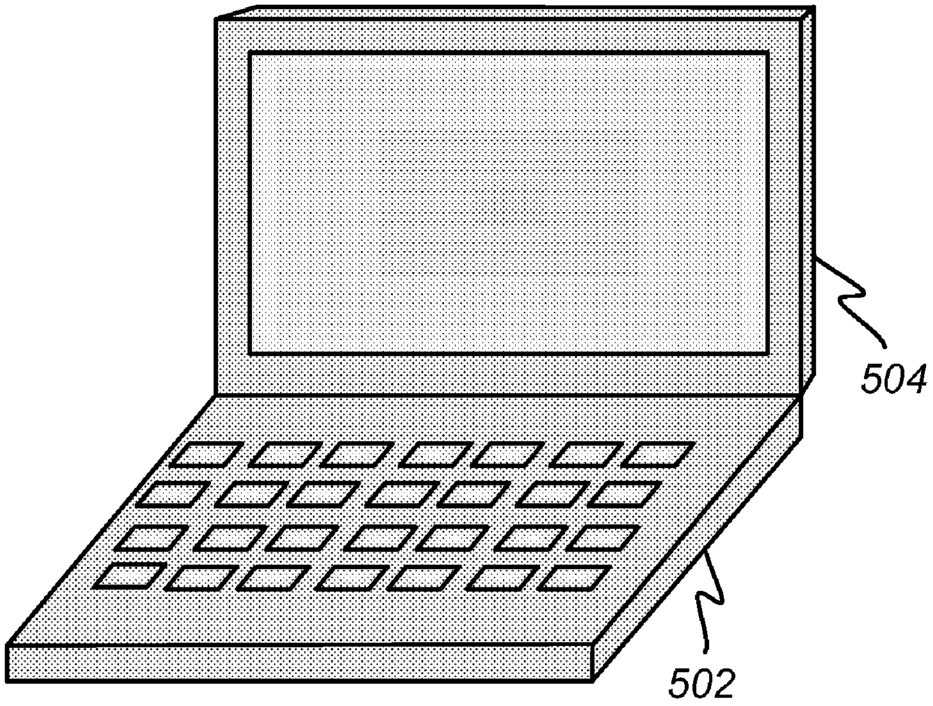
FIGS. 6A and 6B depict perspective views of an embodiment of a user terminal comprising a laptop computer with a four-element patch antenna array.
Figure 6B:
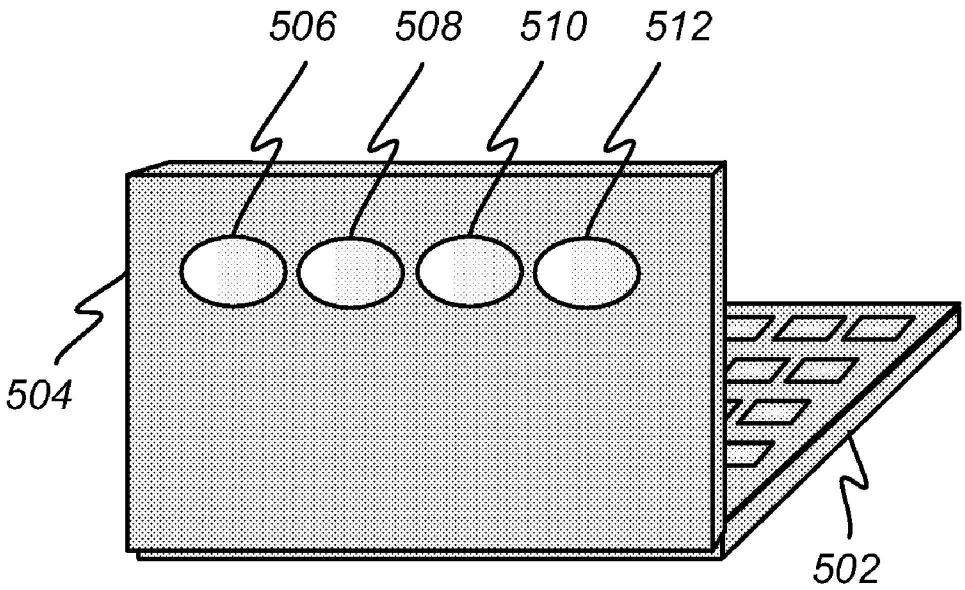

FIGS. 6A and 6B are front and rear perspective views of a laptop computer system incorporating a four-element array antenna in accordance with an embodiment of the present invention. The laptop computer includes a keyboard portion 502 and a screen portion 504. On the back of the screen portion 504, four antenna patch elements 506, 508, 510, and 512 are located. The radio-frequency integrated circuit 434 and DBF processing hardware 416 and 418 (see FIG. 4) may be located within the laptop housing. The DBF processor may also be integrated with the main laptop processor, which would be configured to dedicate a fraction of its computational power to the digital-beam-forming algorithm. It should be appreciated that other configurations of a patch-antenna array, including configurations that use more or fewer than four elements, would fall within the scope and spirit of the present invention.

Figure 7:
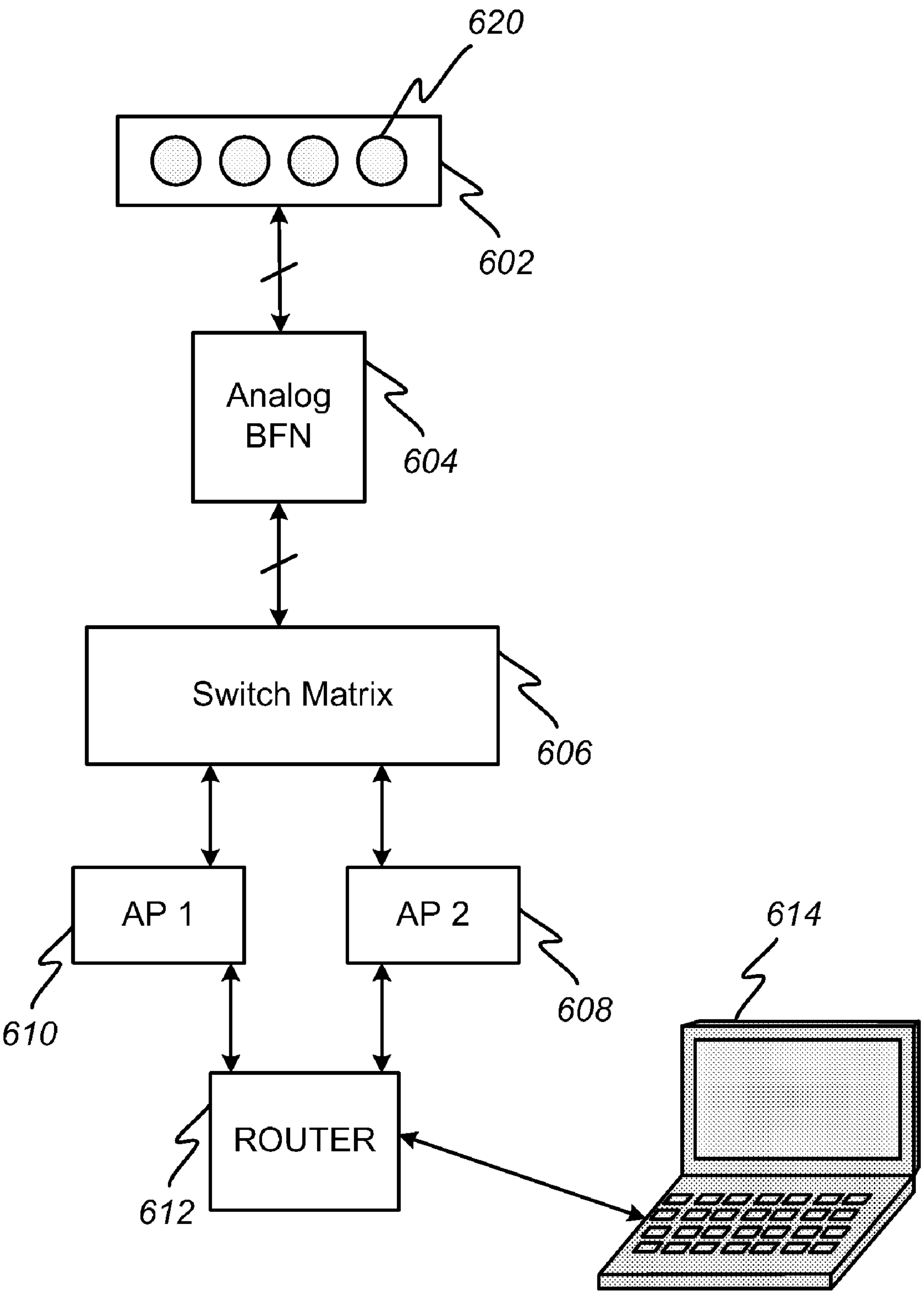
FIG. 7 depicts a block diagram of an embodiment of a user terminal constructed from commercial-off-the-shelf networking components.

FIG. 7 is a block diagram of a system demonstrating a multi-beam channel bonding system in accordance with an embodiment of the present invention. The system depicted in FIG. 7 is built using commercial off-the-shelf (COTS) components and features an analog multi-beam beam former 604 rather than a digital beam forming system. An example of an analog multi-beam beam former, or beam forming network (BFN) is a four-by-four Butler Matrix that has four element ports and four beam ports. Such a device is capable of forming four orthogonal beams simultaneously. The four element ports are the inputs in receive mode and the outputs in transmit mode. Similarly, the four beam ports are the outputs in receive mode and the inputs in transmit mode. These four beams point in four fixed directions and cover approximately one quarter of the entire field of view.

To transmit data, a computer 614 communicates with an Ethernet router 612 that communicates with two wireless access points 610 and 608 implementing the IEEE 802.11 protocol. A bi-directional switch matrix 606 includes two inputs and four outputs and serves as a beam-selection mechanism, connecting two of the four available beams individually to the communication paths. The switch matrix 606 routes the output of each access point 610 and 608 simultaneously to two of the four inputs of the analog beam forming network (BFN) 604. The analog BFN 604 simultaneously divides each of the two input signals into four paths, applies appropriate phase and amplitude weighting individually to the two signals from the access points 608 and 610, sums the two weighted signals in each of the four paths, and then routes them to the four elements of the patch array 602. The phase and amplitude factors applied by the analog BFN 604 cause a transmitted beam to be radiated in one of four directions that can be selected via the switch matrix. The direction of the beam radiated by the patch array 602 can be changed by selecting different switch positions in the switch matrix 606 to apply different signals to the inputs of the BFN 604.

In receive mode, the system works similarly. The signals detected by each of the four radiating elements, e.g., 620, are passed to the analog beam former 604 which then applies the appropriate phase and amplitude correction factors to cause the four signals to add coherently. The switch matrix is set such that the coherent beam from a first direction is switched to the first access point 610, and the coherent beam from a second direction is switched to the second access point 608. The Ethernet router 612 combines the packets from each of the two access points and bonds them into a single virtual channel with enhanced bandwidth.

Thus, a multi-beam system is achieved that uses beam forming to spatially separate simultaneous wireless network connections and then bond them together for enhanced bandwidth and reliability. Those skilled in the art will likely recognize further advantages of the present invention, and it should be appreciated that various modifications, adaptations, and alternative embodiments thereof may be made within the scope and spirit of the present invention. The invention is further defined by the following claims.

What is claimed is:

1. A wireless communications system comprising:
- a media center adapted to store a plurality of data;
- at least a first wireless access point and a second wireless access point connected to the media center and adapted to send the plurality of data, wherein the first and second wireless access points operate at substantially the same frequency; and
- a user terminal comprising:
  - an antenna array comprising at least two antenna elements adapted to receive the plurality of data;
  - a radio-frequency front end adapted to receive signals from the at least two antenna elements;
  - a beam-forming unit connected to the radio-frequency front end and adapted to synthesize at least a first beam having a first beam width directed at the first wireless access point and a second beam directed at the second wireless access point, wherein the first wireless access point and second wireless access point are spatially separated by an angular distance greater than the first beam width;
  - a demodulator unit adapted to demodulate the first beam to extract a first data stream and the second beam to extract a second data stream; and
  - a channel bonding unit adapted to combine the first data stream and the second data stream to recover the plurality of data.

2. The wireless communications system of claim 1, wherein:
- the first wireless access point and the second wireless access point are further adapted to receive a plurality of user data.
- the user terminal is further adapted to send the plurality of user data.

3. The user terminal of claim 1, wherein the antenna array is further adapted to include four patch elements.

4. The user terminal of claim 1, wherein the radio-frequency front end is further adapted to include:
- at least two low-noise amplifiers (LNAs) connected to corresponding ones of the at least two antenna elements;
- at least two band-pass filters connected to corresponding ones of the at least two LNAs;
- at least two frequency down-converters connected to corresponding ones of the at least two band-pass filters; and
- at least two analog-to-digital converters connected to corresponding ones of the at least two frequency down-converters.

5. The user terminal of claim 1, wherein the radio-frequency front end is further adapted to include:
- at least two low-noise amplifiers (LNAs) connected to corresponding ones of the at least two antenna elements;
- at least two band-pass filters connected to corresponding ones of the at least two LNAs; and
- at least two radio-frequency analog-to-digital converters connected to corresponding ones of the at least two band-pass filters.

6. The user terminal of claim 1, wherein the radio-frequency front end is further adapted to include:
- at least two low-noise amplifiers (LNAs) connected to corresponding ones of the at least two antenna elements;
- at least two band-pass filters connected to corresponding ones of the at least two LNAs;
- at least two bi-phase modulators connected to corresponding ones of the at least two band-pass filters;
- a code-generating unit adapted to generate at least a first pseudonoise (PN) code and a second PN code, wherein the first PN code is orthogonal to the second PN code, and wherein the first and second PN codes are applied to corresponding ones of the at least two bi-phase modulators; and
- a summing unit connected to the at least two bi-phase modulators and adapted to combine signals from the at least two bi-phase modulators to create a composite receive signal.

7. The user terminal of claim 6, further adapted to include:
- a frequency down-converter adapted to down-convert the composite receive signal; and
- an analog-to-digital converter adapted to digitize the down-converted composite receive signal.

8. The user terminal of claim 6, further adapted to include a radio-frequency analog-to-digital converter adapted to digitize the composite receive signal.

9. The user terminal of claim 1, wherein the beam-forming unit comprises an analog beam-forming network adapted to:
- shift a phase of signals received from the radio-frequency front end; and
- adjust an amplitude of signals received from the radio-frequency front end.

10. The user terminal of claim 1, wherein:
- the radio-frequency front end includes at least one analog-to-digital converter adapted to generate digital samples; and
- the beam-forming unit comprises a digital beam-former (DBF) processor connected to the at least one analog-to-digital converter wherein the DBF processor is adapted to multiply the digital samples by complex weighting factors.

11. The wireless communications system of claim 1, wherein:
- the user terminal comprises an electronic device including a general-purpose microprocessor; and
- the beam-forming unit comprises a portion of the general-purpose microprocessor of the electronic device;
- wherein the beam-forming unit is adapted to dynamically demand resources from the general-purpose microprocessor to synthesize at least the first beam directed at the first wireless access point and the second beam directed at the second wireless access point.

12. A wireless communications system comprising:
- a media center adapted to store a plurality of data;
- at least a first wireless access point and a second wireless access point connected to the media center and adapted to send and receive the plurality of data, wherein the first and second wireless access points operate at substantially the same frequency; and
- a user terminal comprising:

an antenna array comprising four patch antenna elements adapted to send and receive the plurality of data;

a radio-frequency front end adapted to receive signals from the four patch antenna elements;

at least one analog-to-digital converter adapted to digitize the signals received from the four patch antenna elements;

a digital beam-forming (DBF) processor connected to the at least one analog-to-digital converter and adapted to synthesize at least a first beam having a first beam width directed at the first wireless access point and a second beam directed at the second wireless access point wherein the first wireless access point and second wireless access point are spatially separated by an angular distance greater than the first beam width;

a demodulator unit adapted to demodulate the first beam to extract a first data stream and the second beam to extract a second data stream; and a channel bonding unit adapted to combine the first data stream and the second data stream to recover the plurality of data.

13. The user terminal of claim 12, wherein the radio-frequency front end is further adapted to include:

four low-noise amplifiers (LNAs) connected to corresponding ones of the four patch antenna elements;

four band-pass filters connected to corresponding ones of the four LNAs;

four frequency down-converters connected to corresponding ones of the four band-pass filters; and four analog-to-digital converters connected to corresponding ones of the four frequency down-converters.

14. The user terminal of claim 12, wherein the radio-frequency front end is further adapted to include:

four low-noise amplifiers (LNAs) connected to corresponding ones of the four patch antenna elements;

four band-pass filters connected to corresponding ones of the four LNAs;

four conditioning circuits connected to corresponding ones of the four band-pass filters; and four radio-frequency analog-to-digital converters connected to corresponding ones of the four conditioning circuits.

15. The user terminal of claim 12, wherein the radio-frequency front end is further adapted to include:

four low-noise amplifiers (LNAs) connected to corresponding ones of the four patch antenna elements;

four band-pass filters connected to corresponding ones of the four LNAs;

four bi-phase modulators connected to corresponding ones of the four band-pass filters;

a code-generating unit adapted to generate a first pseudonoise (PN) code, a second PN code, a third PN code, and a fourth PN code, wherein the first, second, third, and fourth PN codes are mutually orthogonal, and wherein the first, second, third, and fourth PN codes are applied to corresponding ones of the four bi-phase modulators; and a summing unit connected to the four bi-phase modulators and adapted to combine signals from the four bi-phase modulators to create a composite receive signal.

16. The user terminal of claim 15, further adapted to include a frequency down-converter adapted to down-convert the composite receive signal wherein the at least one analog-to-digital converter is adapted to digitize the composite receive signal after down-conversion.

17. The user terminal of claim 15, wherein the at least one analog-to-digital converter is further adapted to digitize the composite receive signal at radio frequency.

18. The wireless communications system of claim 12, wherein:

the user terminal comprises an electronic device including a general-purpose microprocessor; and the DBF processor comprises a portion of the general-purpose microprocessor of the electronic device;

wherein the DBF processor is adapted to dynamically demand resources from the general-purpose microprocessor to synthesize at least the first beam directed at the first wireless access point and the second beam directed at the second wireless access point.

19. A user terminal comprising:

an antenna array comprising at least two antenna elements;

a radio-frequency front end adapted to receive signals from the at least two antenna elements;

a beam-forming unit connected to the radio-frequency front end and adapted to synthesize at least a first beam a second beam;

a demodulator unit adapted to demodulate the first beam to extract a first data stream and the second beam to extract a second data stream;

a channel bonding unit adapted to combine the first data stream and the second data stream;

a router adapted to generate a first transmit data stream and a second transmit data stream;

a modulator unit adapted to modulate the first transmit data stream to create a first digital baseband signal and the second transmit data stream to create a second digital baseband signal;

a digital synthesizer adapted to synthesize a first analog transmit signal from the first digital baseband signal and a second analog transmit signal from the second digital baseband signal; and a frequency up-converter unit adapted to up-convert the first analog transmit signal to create a first radio-frequency transmit signal and to up-convert the second analog transmit signal to create a second radio-frequency transmit signal, wherein the first radio-frequency transmit signal and the second radio-frequency transmit signal are at substantially the same frequency;

wherein the beam-forming unit is further adapted to synthesize a first transmit beam having a first beam width from the first radio-frequency transmit signal and a second transmit beam from the second radio-frequency transmit signal, wherein the first transmit beam and the second transmit beam are separated by an angular distance greater than the first beam width.

20. The user terminal of claim 19, wherein the antenna array is further adapted to include four patch elements.

21. The user terminal of claim 19, wherein the radio-frequency front end is further adapted to include:

at least two low-noise amplifiers (LNAs) connected to corresponding ones of the at least two antenna elements;

at least two band-pass filters connected to corresponding ones of the at least two LNAs;

at least two frequency down-converters connected to corresponding ones of the at least two band-pass filters; and at least two analog-to-digital converters connected to corresponding ones of the at least two frequency down-converters.

22. The user terminal of claim 19, wherein the radio-frequency front end is further adapted to include:

at least two low-noise amplifiers (LNAs) connected to corresponding ones of the at least two antenna elements;

at least two band-pass filters connected to corresponding ones of the at least two LNAs; and at least two radio-frequency analog-to-digital converters connected to corresponding ones of the at least two band-pass filters.

23. The user terminal of claim 19, wherein the radio-frequency front end is further adapted to include:

at least two low-noise amplifiers (LNAs) connected to corresponding ones of the at least two antenna elements;

at least two band-pass filters connected to corresponding ones of the at least two LNAs;

at least two bi-phase modulators connected to corresponding ones of the at least two band-pass filters;

a code-generating unit adapted to generate at least a first pseudonoise (PN) code and a second PN code, wherein the first PN code is orthogonal to the second PN code, and wherein the first and second PN codes are applied to corresponding ones of the at least two bi-phase modulators; and a summing unit connected to the at least two bi-phase modulators and adapted to combine signals from the at least two bi-phase modulators to create a composite receive signal.

24. The user terminal of claim 23, further adapted to include:

a frequency down-converter adapted to down-convert the composite receive signal; and an analog-to-digital converter adapted to digitize the down-converted composite receive signal.

25. The user terminal of claim 23, further adapted to include a radio-frequency analog-to-digital converter adapted to digitize the composite receive signal.

26. The user terminal of claim 19, wherein the beam-forming unit comprises an analog beam-forming network adapted to:

shift a phase of signals received from the radio-frequency front end; and adjust an amplitude of signals received from the radio-frequency front end.

27. The user terminal of claim 19, wherein:

the radio-frequency front end includes at least one analog-to-digital converter adapted to generate digital samples; and the beam-forming unit comprises a digital beam-forming (DBF) processor connected to the at least one analog-to-digital converter wherein the DBF processor is adapted to multiply the digital samples by complex weighting factors.

28. The user terminal of claim 19, further comprising an electronic device including a general-purpose microprocessor; wherein the beam-forming unit comprises a portion of the general-purpose microprocessor of the electronic device;

wherein the beam-forming unit is adapted to dynamically demand resources from the general-purpose microprocessor to synthesize at least the first beam and the second beam.

29. In a wireless communication system including a media center containing communication data connected to at least a first wireless access point and a second wireless access point, and a user terminal including an array antenna and a beam-forming unit, a method for improving communication bandwidth comprises:

dividing the communication data into a first data portion and a second data portion;

routing the first data portion to the first wireless access point;

transmitting the first data portion at a first frequency;

routing the second data portion to the second wireless access point;

transmitting the second data portion at the first frequency;

forming a first beam having a first beam width from the array antenna that is directed at the first wireless access point;

forming a second beam from the array antenna that is directed at the second wireless access point, wherein the first beam and the second beam are spatially separated by an angular distance greater than the first beam width;

receiving the first data portion over the first beam;

receiving the second data portion over the second beam; and bonding the first data portion and the second data portion to recover the communication data.

30. The method of claim 29, wherein the steps of forming a first beam and a second beam further comprise:

adjusting the analog phases of signals from the array antenna;

adjusting the analog amplitudes of signals from the array antenna; and combining the analog signals from the array antenna to create the first beam and the second beam.

31. The method of claim 29, wherein the steps of forming a first beam and a second beam further comprise:

digitizing signals from the array antenna;

multiplying the digitized signals by complex weighting factors; and combining the digitized signals after weighting to form the first beam and the second beam.

32. The method of claim 29, wherein the steps of receiving the first data portion and receiving the second data portion further comprise:

frequency down-converting signals from the array antenna; and digitizing the signals from the array antenna after frequency down-converting.

33. The method of claim 29, wherein the steps of receiving the first data portion and receiving the second data portion further comprise digitizing the signals from the array antenna at radio frequency.

* * * * *